June 7, 1966 A. NORWICH 3,255,410
SYSTEM AND METHOD FOR MEASURING A PROPERTY OF DIELECTRIC
MATERIAL BY PERIODICALLY AND ALTERNATELY APPLYING
SIGNALS AT DIFFERENT FREQUENCIES TO A CAPACITANCE
PROBE AND MEASURING THE DIFFERENCE IN OUTPUT
SIGNALS WHILE MAINTAINING THE AVERAGE
AMPLITUDE OF THE OUTPUT
SIGNALS CONSTANT
Filed Feb. 21, 1962

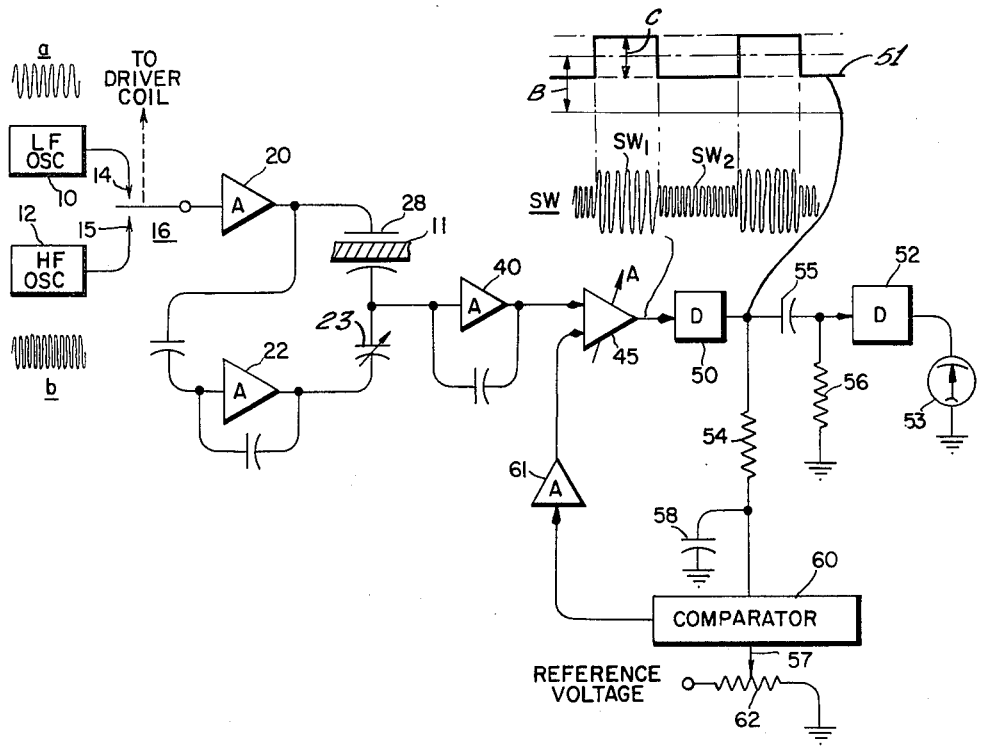

Inventor
Alan Norwich
by Anthony D. Cunnamo
ATTORNEY

United States Patent Office 3,255,410
Patented June 7, 1966

3,255,410
SYSTEM AND METHOD FOR MEASURING A PROPERTY OF DIELECTRIC MATERIAL BY PERIODICALLY AND ALTERNATELY APPLYING SIGNALS AT DIFFERENT FREQUENCIES TO A CAPACITANCE PROBE AND MEASURING THE DIFFERENCE IN OUTPUT SIGNALS WHILE MAINTAINING THE AVERAGE AMPLITUDE OF THE OUTPUT SIGNALS CONSTANT
Alan Norwich, Columbus, Ohio, assignor to Industrial Nucleonics Corporation, a corporation of Ohio
Filed Feb. 21, 1962, Ser. No. 174,746
6 Claims. (Cl. 324—61)

This invention relates generally to a measurement system having a plurality of signals at different frequencies applied to a capacitance probe, and specifically to a simplified detector circuit for use in such a system.

The present invention is an improvement on the system described in U.S. Serial No. 41,975 for Measuring System by Albert F. G. Hanken and assigned to the same assignee, now Paent No. 3,155,900. In that system the capacitive probe forms part of a balanced bridge circuit. The capacitor includes as a dielectric the material to be measured in the industrial process. The bridge is simultaneously supplied with a pair of signals at separate frequencies, that is, the capacitive arms of the probe have applied at its terminals balanced voltages at widely displaced frequencies. There is produced across the bridge a pair of signals at the respective frequencies but at an amplitude varying in magnitude in accordance with the unbalance of the bridge at each frequency. The unbalanced signals are amplified in a wideband amplifier and then applied to a pair of filters. The first filter is adapted to select the signal at the first frequency and pass it to detector. The output of the detector is a D.C. signal of a magnitude varying in accordance with the amplitude of the signal at the first frequency. In a similar manner the second filter is adapted to select the signal at the second frequency and pass it to a second detector. The output of the second detector is a D.C. signal of a magnitude varying in accordance with the amplitude of the signal at the second frequency. The two signals at the output of the two detectors are then applied to a computer for indicating a response relating to a qualitative or quantiative constituent of the material in the capacitance probe.

In the copending application of Ko-Hsin Liu, Serial No. 174,917 filed February 21, 1962 for Measuring System there is disclosed a modification of the aforementioned Hanken application. In the Liu application the signals are sampled alternately and the output signals of the A.C. summing amplifier are synchronously fed into a pair of demodulator circuits.

The system of the present invention is a further modification to the aforementioned Hanken and Liu applications in that only a single amplifying-detecting circuit for both signals is used. In this way only the ratio of the signals is of importance and changes in gain of the system or nonlinearities will affect both signals equally leaving the ratio unchanged  Also synchronous demodulation of the two signals is not required to separate the two signals for application to separate detectors.  Finally the number of circuit components is reduced.

Accordingly it is a primary object of the present invention to provide a new and improved dual frequency measurement system.

A further object of the present invention is to improve the reliability of the prior dual frequency measurement system.

Another object of the present invention is to simplify the measurement circuitry in a dual frequency measurement system.

Still another object of the present invention is to provide a dual frequency measurement system having a common amplifying and detecting circuit for both frequencies.

Other objects and features of the present invention will become apparent from the following detailed description when taken in conjunction with the drawing single figure illustrating a preferred embodiment of my invention.

Referring now to the drawing a pair of oscillator generators 10 and 12 are operative to produce a pair of signals represented by waveforms $a$ and $b$ respectively. These signals are at widely displaced frequencies and are referred to hereinafter as the low and high frequency signals. It is preferred in the system of the present invention to alternately apply the two signals to the bridge excitation amplifier 20 such as disclosed in the aforementioned Liu application. This is accomplished with a switch 16 having alternate contacts 14 and 15. This switch may be an electrical mechanical switch such as a chopper or may be. an electronic switch. The amplifier 20 amplifies the signals to the desired amplitude and then feeds the signals into the phase inverting amplifier 22 to obtain exactly 180° phase reversed signals for both low and high frequency. The two signals are then alternately applied to the plates of capacitance probe 28. The material 11 under measurement, as heretofore mentioned, forms a part of the dielectric of the capacitance. At the same time the amplifier 22 acts to apply signals 180° out of phase to the balancing capacitor 23 of the bridge, thus providing the balancing signal to balance the effect of the empty probe as is described in the aforesaid Hanken application. The amplifier 22 itself may be as described in greater detail in the copending application of Alan Norwich, Serial No. 268,268, originally filed February 21, 1962 as Serial No. 174,748, now abandoned for Measuring System.

As an illustration to the operation of the present invention moisture measurement is considered. When the material 11 contains no moisture the high frequency signal will be of the same amplitude as the low frequency signal ($S_H=S_L$). If moisture would be introduced in the material 11 the low frequency signal will increase at a greater rate than the high frequency signal ($S_L=S_H$). However, if the basis weight were to be increased, both the high and the low frequency signals would increase, but the ratio of the one signal to the other would remain constant.

Both signals are passed to the controllable gain amplifier 45 and to the high and low frequency detector 50. When the high frequency signal is equal in amplitude to the low frequency signal, both will be rectified and alternate D.C. voltages will appear at the detector 50 output. One voltage will be proportional to the low frequency signal and the other voltage will be proportional to the high frequency signal. Since both signals are equal in amplitude the result will be a steady D.C. output.

If the high and low frequency signal levels become relatively different due to the presence of moisture in the material 11, the amplitude of the low frequency signal $sw_1$ relative to the high frequency signal $sw_2$ will be related to the moisture level of the material 11. The detector 50 then rectifies the signals at each frequency and the alternate D.C. voltages, corresponding to the respective low and high frequency signals, will have different amplitudes and hence comprise a signal approximating a square wave 51. The square wave 51 is filtered by a low pass filter such as one comprising a resistor 54 and a capacitor 58 to derive a D.C. voltage corresponding to the average amplitude, B, of the square wave 51. This D.C. voltage appearing on capacitor 58 is compared in a comparator 60 with a preset reference voltage developed on a tap 57 on a potentiometer 62 connected between ground and a reference voltage supply.

The comparator 60 may be a conventional subtraction circuit whereby its output signal corresponds to the difference between the average signal amplitude B and the reference voltage. This difference may be applied through an amplifier 61 to supply an automatic gain control feedback to control the gain of the variable gain amplifier 45. The function of the feedback loop comprising filter 54, 58, comparator 60 with reference voltage from tap 57, and amplifier 61 is merely to supply a gain control signal so that the gain of amplifier 45 is automatically controlled to provide an average signal output of constant amplitude. Other automatic gain control circuits may be used.

With the average amplitude of the square wave signal maintained at a constant level, the A.C. component of the square wave signal is rectified in detector 52 after the D.C. component is filtered out by capacitance 55-resistance 56 network. The D.C. component output of the detector 52 corresponds to the difference C between the two components of square wave 51, hence to the difference between the signals levels at the two frequencies, and hence to the moisture content of the material 11. This D.C. voltage may now be read out on a meter 53 or other suitable readout means.

If the basis weight of the sample should be increased, the automatic gain control action of the comparator circuit 60 will reduce the gain of amplifier 45. This feedback signal will hold the average level of the detector 50 output signal constant at a value equal to the reference voltage selected. In this way the amplitude of the square wave is kept constant thereby making the system independent of basis weight changes.

An alternative arrangement to the present invention would be to use a single oscillator with a sinusoidal frequency sweep between the high and low frequencies. In that case the output of the detector 50 would be a sine wave rather than a square wave, and chopper sampling would be eliminated.

Other alternative embodiments and arrangements may be visualized without departing from the spirit and scope of the present invention.

What is claimed is:

1. A system for determining a property of a dielectric material, said system comprising signal generator means for generating input signals periodically changing in frequency between a first frequency and a second substantially different frequency, detecting means, and a measuring probe coupled to said signal generator means and having spaced electrodes arranged for applying said input signals to at least a portion of said material and coupling said detecting means to said portion, said detecting means including means for deriving modified signals resulting from the input signals applied to said portion as these applied signals are influenced by said material and for maintaining the average amplitude of said modified signals substantially constant, and means for measuring the change in amplitude of said modified signals caused by said periodic changes in frequency of said input signals to provide an indication of said property independent of the mass of said material.

2. A system for determining a property of a dielectric material, said system comprising signal generator means for generating input signals alternating between a high frequency and a low frequency, detecting means, and a measuring probe coupled to said signal generator means and having spaced electrodes arranged for applying said input signals to at least a portion of said material and coupling said detecting means to said portion, said detecting means including means for deriving modified signals resulting from the input signals applied to said portion as these applied signals are influenced by said material and for maintaining the average amplitude of said modified signals substantially constant, and means for measuring the change in amplitude of said modified signals caused by the changes in frequency of said input signals from one of said high and low frequencies to the other to provide an indication of said property independent of the mass of said material.

3. A system for determining a property of a dielectric material, said system comprising signal generator means for generating input signals alternating between a high frequency and a low frequency, detecting means, and a measuring probe coupled to said signal generator means and having spaced electrodes arranged for applying said input signals to at least a portion of said material and coupling said detecting means to said portion, said detecting means including means for deriving modified signals resulting from the input signals applied to said portion as these applied signals are influenced by said material, an automatic gain controlled amplifier for receiving said modified signals and producing corresponding amplified modified signals of substantially constant average amplitude, and means for measuring the change in amplitude of said modified signals caused by the changes in frequency of said input signals from one of said high and low frequencies to the other to provide an indication of said property independent of the mass of said material.

4. A system for determining a property of a dielectric material, said system comprising signal generator means for generating input signals alternately at a high frequency and a low frequency, detecting means, and a measuring probe coupled to said signal generator means and having spaced electrodes arranged for applying said input signals to at least a portion of said material and coupling said detecting means to said portion, said detecting means including means for deriving modified signals alternating in frequency and resulting from the input signals applied alternately at the respective frequencies to said portion as these applied signals are influenced by said material, a variable gain amplifier for receiving said modified signals and producing corresponding amplified modified signals, a detector coupled to said amplifier for rectifying said amplified modified signals and converting them into two substantially D.C. signals alternating with the alternation of the frequency of the input signals and each corresponding in amplitude with the amplitude of said modified signals at a respective frequency, means responsive to the average amplitude of said two D.C. signals for controlling the gain of said variable gain amplifier to maintain said average amplitude substantially constant, and means for measuring the difference in amplitude of said two D.C. signals to provide an indication of said property independent of the mass of said material.

5. A method for determining a property of a dielectric material, said method comprising applying input signals periodically changing in frequency between a first frequency and a second substantially different frequency to at least a portion of said material, deriving modified signal resulting from the input signals applied to said portion as these applied signals are influenced by said material, maintaining the average amplitude of said modified signals substantially constant, and measuring the change in amplitude of said modified signals caused by said periodic changes in frequency of said input signals to provide an indication of said property independent of the mass of said material.

6. A method for determining a property of a dielectric material, said method comprising alternately applying input signals at a high frequency and a low frequency to at least a portion of said material, deriving modified signals resulting from the input signals applied to said portion as these applied signals are influenced by said material, maintaining the average amplitude of said modified signals substantially constant, and measuring the change in amplitude of said modified signals caused by the changes in the frequency of the input signals from said high frequency to said low frequency and from said low frequency to said high frequency to provide an indication of said property independent of the mass of said material.

References Cited by the Examiner
UNITED STATES PATENTS

| | | | |
|---|---|---|---|
| 2,950,436 | 8/1960 | Butticaz et al. | 324—61 |
| 3,159,787 | 12/1964 | Sexton et al. | 324—99 |

FOREIGN PATENTS

| | | |
|---|---|---|
| 217,898 | 10/1958 | Australia. |
| 622,470 | 3/1949 | Great Britain. |

WALTER L. CARLSON, *Primary Examiner.*

FREDERICK M. STRADER, *Examiner.*

J. P. O'BRIEN, A. E. RICHMOND, *Assistant Examiners.*

UNITED STATES PATENT OFFICE
CERTIFICATE OF CORRECTION

Patent No. 3,255,410                    Dated   June 7, 1966

Inventor(s)    Alan Norwich

It is certified that error appears in the above-identified patent and that said Letters Patent are hereby corrected as shown below:

Column 1, line 22, "Paent" should read ---Patent---;
Column 1, lines 35 and 36, "to detector" should read ---to a detector---;
Column 1, line 60, "unchanged Also" should read ---unchanged. Also---.
Column 2, line 35, "abandoned for" should read ---abandoned, for---;
Column 2, line 43, "$(S_L=S_H)$" should read ---$(S_L>S_H)$---.

SIGNED AND
SEALED

JUL 7 1970

(SEAL)
Attest:

Edward M. Fletcher, Jr.                    WILLIAM E. SCHUYLER, JR.
Attesting Officer                          Commissioner of Patents